Patented Mar. 31, 1931

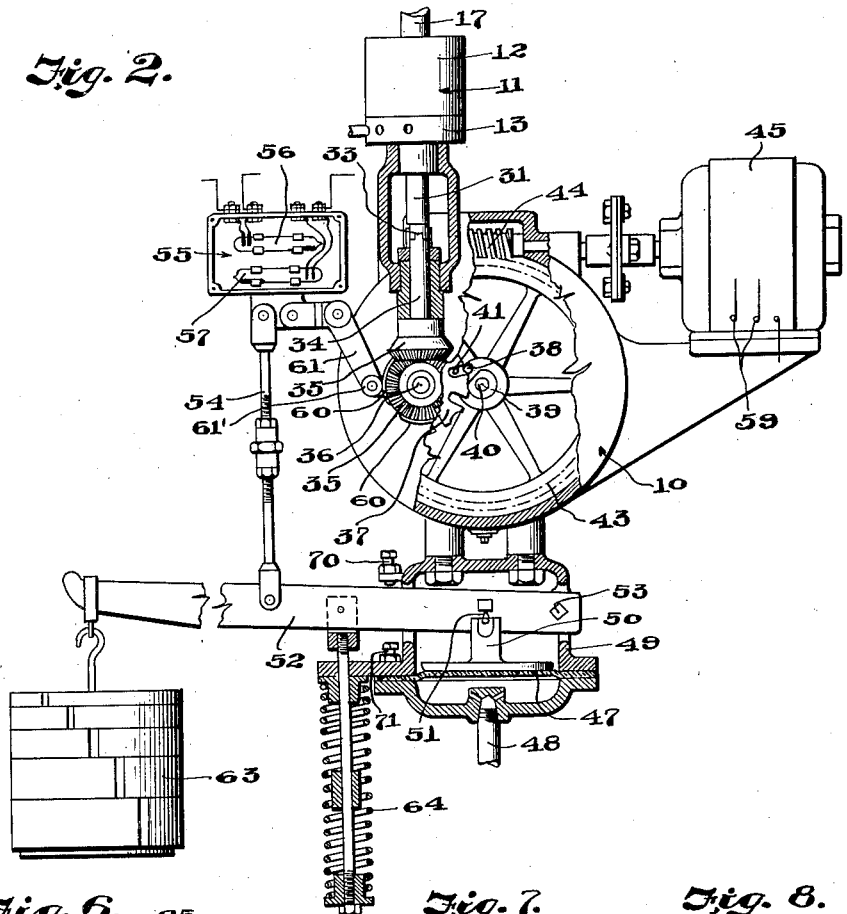
Fig. 2.
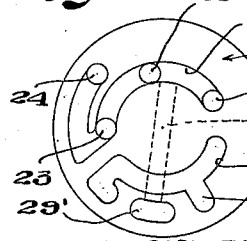
FULL CAPACITY
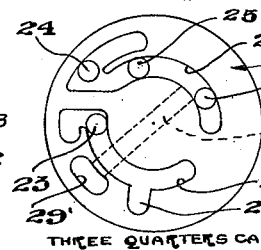
THREE QUARTERS CAPACITY
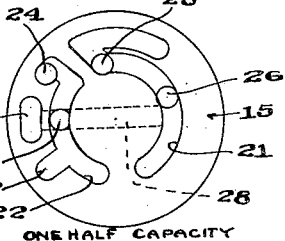
ONE HALF CAPACITY
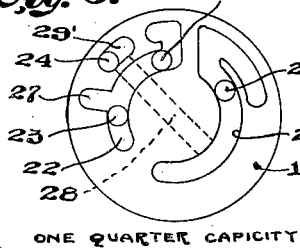
ONE QUARTER CAPICITY
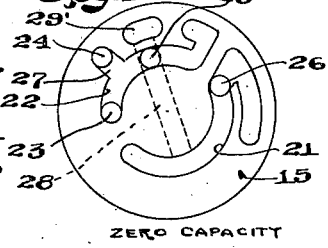
ZERO CAPACITY
A. V. SAHAROFF.
INVENTOR
ATTORNEY

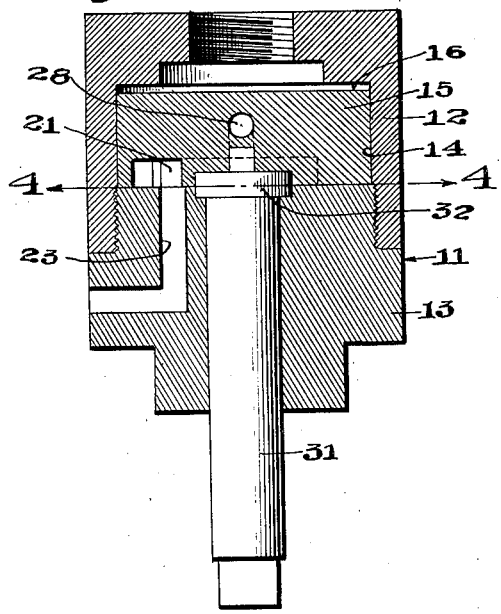
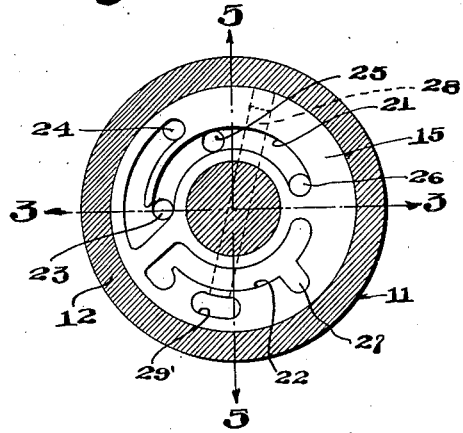
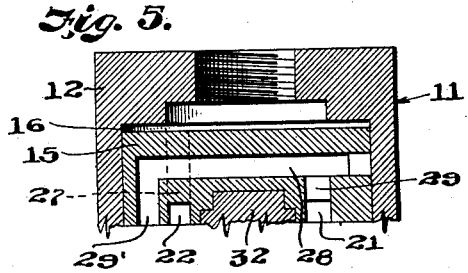
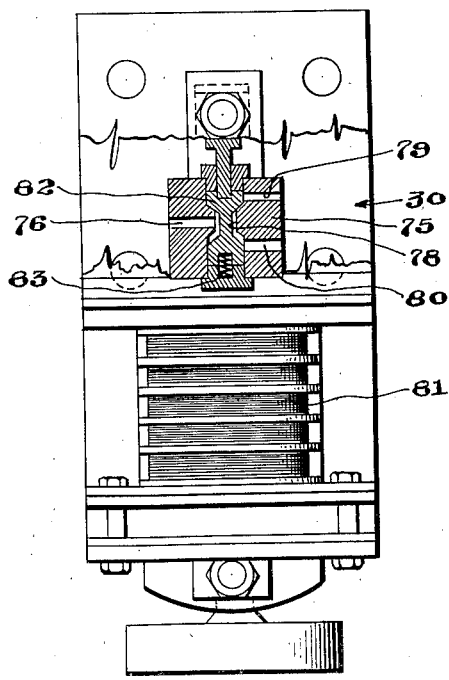

1,798,435

UNITED STATES PATENT OFFICE

ALEXANDER V. SAHAROFF, OF CINCINNATI, OHIO, ASSIGNOR TO WORTHINGTON PUMP AND MACHINERY CORPORATION, OF NEW YORK, N. Y., A CORPORATION OF VIRGINIA

REGULATOR FOR VARIABLE-CAPACITY COMPRESSORS

Application filed October 23, 1928. Serial No. 314,434.

This invention relates to a novel apparatus for regulating the unloading and loading of fluid compressors gradually; that is, an automatic pressure regulator by means of which the volume of fluid compressed is varied automatically with the demand for fluid, so as to maintain practically constant pressure and obtain the resultant advantages in compressor operation. Among such advantages are relatively low temperatures resulting in relatively high efficiency, greatly reduced carbon deposits with resulting improved valve action, improved lubrication and consequently less cylinder wear. These features are particularly marked should the compressor operate at low capacity an appreciable part of the time, such as most compressors are called upon to do.

In variable capacity compressor structures embodying the present invention, a series of control valves, each acting to control a partial unloading of the compressor cylinder or cylinders, so as to vary the cylinder capacity in accordance with the number of control valves operated, and the required operation of these control valves is secured by a regulator acting to vary the relative pressures tending to move these valves in opposite directions, for unloading or loading the cylinders.

An object of the present invention is to provide an electrically operated pressure controlled regulator or governor which is positive in operation, eliminating hunting or indecisive action, which will eliminate reversing during movement in case of pressure variation, and one which embodies positive means to stop the governor or regulator at each of the cut-off points or stops to provide proper action of the control valves for unloading or loading the compressor.

Among other objects of the invention are: to provide pressure operated means which control operation of the regulator embodying readily adjustable means which may be adjusted to carry the desired compressor discharge pressure and desired degree in pressure differences between points of loading and unloading a compressor, and whereby the pressure degree between such points may be varied within reasonable limits and to provide protection or safety means whereby the compressor will be completely unloaded at predetermined times independent of its condition of loaded or unloaded regulator controlled operation.

With these objects in view, the invention consists in various features of construction and combination of parts, which will be first described in connection with the accompanying drawings, showing a regulator for variable capacity air or gas compressors of the preferred form embodying the invention, and the features forming the invention will be specifically pointed out in the claims.

In the drawings:

Fig. 2 is a detail view partly in section of the regulator.

Fig. 3 is a vertical section through the distributor valve of the regulator structure, taken on the line 3—3 of Fig. 4.

Fig. 4 is a horizontal section through the distributor valve, taken on the line 4—4 of Fig. 3.

Fig. 5 is a fragmentary vertical section through the distributor valve, taken on the line 5—5 of Fig. 4.

Figure 1:
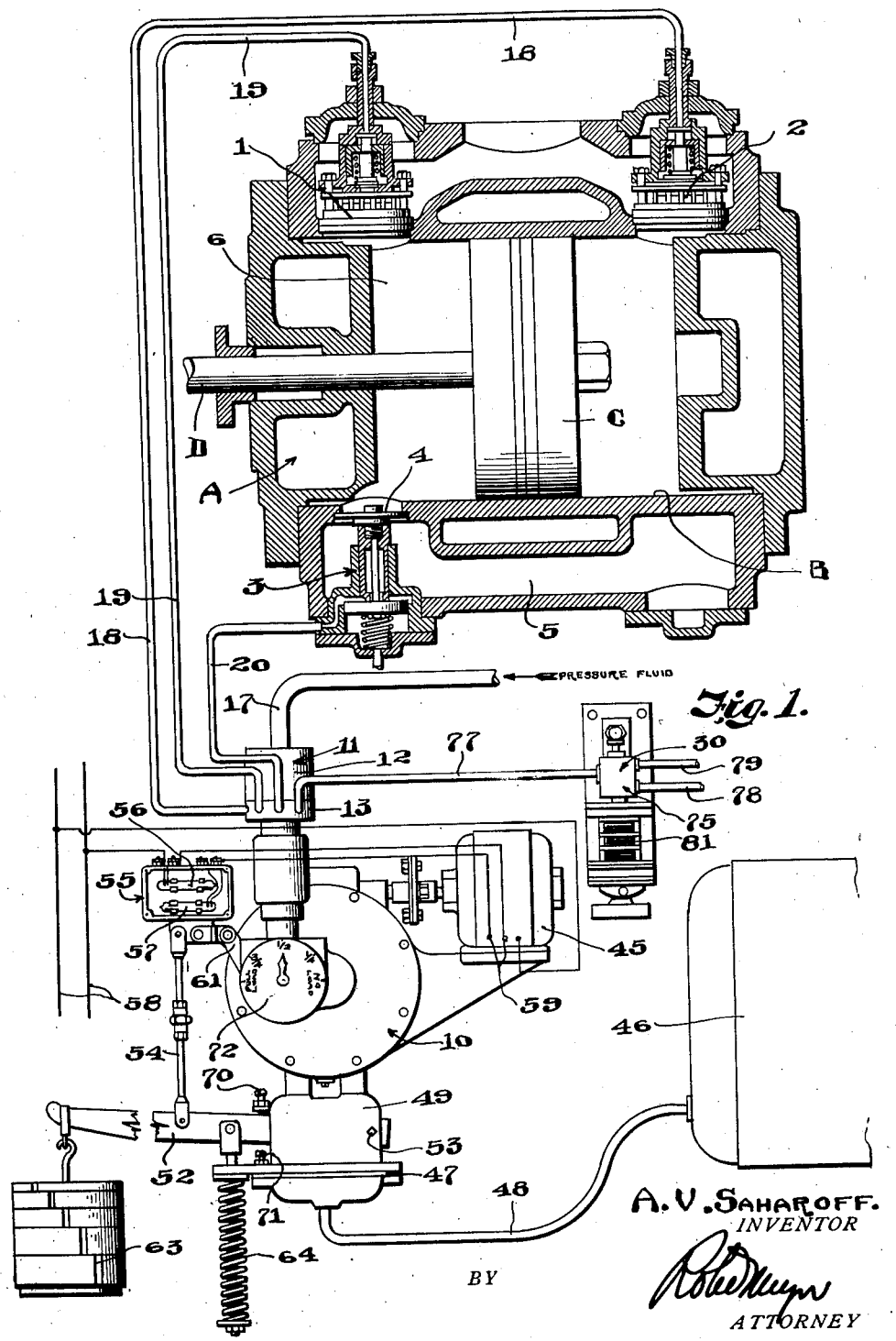
Fig. 1 is a diagrammatic view showing the improved regulator connected to a variable capacity compressor of approved construction.

Figs. 6, 7, 8, 9 and 10 are diagrammatic views of the distributor valve showing the various steps in controlling the capacity of a five step variable capacity compressor, and Fig. 11 is a detailed view partly in section of a solenoid operated valve structure for automatically unloading the compressor at predetermined times, regardless of its condition of loaded or unloaded regulator controlled operation.

Referring more particularly to the drawings, A is a variable capacity compressor of approved construction including a cylinder B in which the piston C is driven or moved by any suitable power through the medium of the piston rod D.

The improved variable capacity compressor may be of approved form, embodying the suction or inlet valves 1 and 2 and approved types of discharge valves (not shown).

The suction valves 1 and 2 are shown as of a type of plate valve, now well known and patented by U. S. Letters Patent to Meyer, Reissue No. 13,991 and No. 1,341,413, so that further specific description of these valves need not be given. Each of the inlet valves 1 and 2, however, is provided with pressure operated means for unseating and holding open the inlet valves, this means being now well-known and illustrated and specifically described in Patent No. 1,579,781. The loading and unloading of the compressor as illustrated in the drawings, is what is commercially known as the five-step variable capacity compressor action, and while a five-step unloading system is shown in the drawings and described in the following specification, it is to be understood that the improved regulator may be used with variable capacity compressors unloaded and loaded by any desired number of steps or fractional capacities without departing from the spirit of this invention.

The variable capacity compressor disclosed in Fig. 1 of the drawings embodies the various steps of operation, such as full capacity at which time the unloading arrangements of the suction or inlet valves 1 and 2 and of the pressure operated unloading or control valve structure 3 are all closed. When, however, the pressure in the receiver or line rises above a predetermined degree, the pressure operated control valve 3 will operate, to move the valve disc 4 off its seat and open the clearance chamber 5 to the crank end 6 of the cylinder, at which time the compressor will operate at 75% of its maximum capacity. Upon further increase in pressure in the line or receiver, the valve 3 will be closed, the unloading mechanism of the inlet valve 1 be held closed while the unloading mechanism of the inlet valve 2 will be open, thereby permitting the compressor to operate at half capacity. Should the pressure in the line or receiver still increase above the desired pressure, the valve 3 will again be opened, the unloading features of the valve 2 will be open, while the valve 1 will be closed, thereby permitting the compressor to operate at one quarter of its maximum capacity. A still further increase in receiver pressure will cause the unloading mechanism of the valve 1 to function and open this valve, holding the valves 1, 2 and 3 all open, at which time the compressor will operate at zero capacity or will idle without compressing air.

Upon the decrease of pressure in the receiver or line, the variable capacity compressor is loaded in proportions to its maximum capacity in a reverse direction to its unloading. This type of variable capacity compressor is well-known and is disclosed in the above mentioned U. S. Letters Patent, No. 1,579,781, so that specific description, further than that just above given, is not thought necessary.

The control or regulating of the capacity at which the variable capacity compressor A operates is regulated or controlled by the regulator structure generically referred to by the numeral 10 and this regulator is connected to the various control or loading and unloading valves 1, 2 and 3, of the compressor, through a distributing valve 11.

The distributing valve 11 comprises a casing or body made up of the connected sections 12 and 13. The section 12 is provided with a recess 14 in which is seated the valve disc 15. A clearance space 16 is provided in the recess 14 and a pipe 17 is connected to the body section 12 for directing fluid under pressure (from any suitable source) into the clearance space 16 and this pressure fluid is distributed through the valve disc 15 to the various pipes 18, 19 and 20, which lead to the control valves 1, 2 and 3, and operate them, upon the admittance of pressure to the valves for opening them to unload the compressor in the manner above referred to.

The valve disc 15 is provided with channels or passageways 21 and 22 which are brought into communication with various ports, 23, 24, 25 and 26 in the section 13 of the valve casing. The port 23 is connected through the pipe 20 with the control valve 3 of the compressor. The port 24 is connected through the pipe 18 with the control valve 1. The port 25 is connected through the pipe 19 with the control valve 2 of the compressor, while the port 26 is connected with the solenoid operated valve 30 when this valve is used in connection with the regulator or is otherwise open to the atmosphere, providing an exhaust or bleed for the distributor valve 11.

When the compressor is operating at full capacity, the valve disc 15 is in the position as shown diagrammatically in Fig. 6 of the drawings, that is, with the ports 23, 24 and 25 connected through the passageway 20 with the port 26, thereby relieving all of the control valves 1, 2 and 3 of pressure from pressure fluid admitted to the distributor valve 11 from the pipe 17. However, when the compressor is operating at three quarter capacity, the port 23 is connected through the passage 22 in the valve disc 15 with the clearance space 16 through the connecting passage 27, allowing fluid under pressure to be admitted to the control valve 3 for opening this valve and partly unloading the compressor by means of the clearance pocket 5. At this time, the ports 24 and 25 are still in communication with the exhaust port 26 through the passage 21, preventing the delivery of pressure fluid to the unloading mechanisms of the control valves 1 and 2.

When the compressor is operating at one half capacity, the disc 15 of the distributor valve 11 is in the position shown diagrammatically in Fig. 8 of the drawings, that is, the ports 23 and 24 are connected by means of the passageway 22 with the clearance space 16 through the connecting passage 27, admitting fluid under pressure to the control valves 3 and 1, opening these valves and unloading the crank end of the compressor. At this time the port 25 is in communication with the exhaust port 26 through the passage 21, thereby preventing the passage of pressure fluid to the control valve 3.

When the compressor is operating at one quarter capacity, the valve disc 15 is in the position as shown diagrammatically in Fig. 9 of the drawings, that is, with the ports 23 and 25 in communication with the clearance space 16 through the passageway 22 and the connecting passage 27, which admits fluid under pressure to the control valves 3 and 2, for unloading the head end of the compressor and partly unloading the crank end of the compressor. At this time the port 24 is in communication with the exhaust port 26 through the passageway 21 and through the passage 28, which prevents the passage of fluid under pressure to the valve 1. The passage 28 is in communication with the passage 21 through the connecting opening 29, as shown in Fig. 5 of the drawings, and it has an angled end 29′ by means of which communication is established with the port 24.

When the compressor is wholly unloaded or is operating at zero capacity, the valve disc 15 is in the position as shown in Fig. 10 of the drawings, and at this time all three of the ports 23, 24 and 25 are cut off from communication with the exhaust port 26, so that fluid under pressure will be admitted to all the control valves 1, 2 and 3 for operating these valves to hold them open to completely unload the compressor.

It is to be understood that the valve disc 15, as shown in the drawings and just above described, is provided with the respective ports and passages for operation in connection with what is commercially known as a five-step variable capacity compressor, but this valve disc may have other arrangements of ports for adapting it for use in connection with variable capacity compressors of other unloading fractional ratios than the five-step described, without departing from the spirit of this invention.

The valve disc 15 is rotated in one direction to bring the various ports 23, 24 and 25 into their operative positions for unloading the compressor, as above described, and in a reverse direction for properly positioning the various passageways relative to the ports for loading the compressor in reverse of its unloading by means of a shaft 31 which is connected to the disc 15 by a suitable coupling 32 of any approved construction. The shaft 31 is in turn connected through a coupling 33 with the shaft 34 of the regulator or governor structure 10. The shaft 34 is connected by means of bevelled gears 35 with the shaft 36 of the governor 10. A Geneva gear 37 is mounted upon the shaft 36 and it is connected through the medium of a pin 38 and pinion 39 with the shaft 40. The Geneva gear 37 is provided with slots 41 suitable in number to the fractional degrees of unloading or to the number of steps in loading or unloading of the variable capacity compressor, and also corresponding to the number of positions of the valve disc 15 of the distributor valve 11, so that, upon each movement of the Geneva gear 37 by the pin 38 and the pinion 39, the valve disc 15 will be moved positively into one of its definite positions or through one step movement and indecisive or hunting movement of the valve disc 15 and consequently any fluttering movement of the unloading or control valves will be prevented.

The shaft 40 which controls movement of the Geneva gear 37 is connected by means of a worm gear 43 and worm 44 with an electric motor 45.

Energizing of the electric motor is in turn controlled through suitable switches 56 or 57 by receiver or line pressure so as to properly control movement of the disc 15 of the distributing valve 11 by receiver or line pressure.

In Fig. 1 of the drawings, a receiver, into which the compressor A discharges, is indicated at 46 and the pressure of fluid in this receiver is transmitted against a diaphragm 47 through a suitable connection 48. The diaphragm 47 is housed in a suitable housing 49 and it has a member 50 connected thereto which has a suitable connection, as shown at 51, with a lever 52 pivoted to the housing 49 as shown at 53. The lever 52 is connected through an adjustable link connection 54 with a mercoid electric switch 55. The mercoid switch structure 55 includes an upper switch 56 and a lower switch 57 which are connected by suitable wiring to the current supply line 58 and contacts 59 of the motor 45 for controlling energizing of the motor for operating it in a clockwise or contraclockwise direction, depending upon which of the switches 56 or 57 is closed. The closing of the respective switches 56 and 57 depends upon the direction in which the lever 52 moves, so that, when the receiver or line pressure is above a predetermined point the fluid under such pressure admitted against the diaphragm 47 will raise the lever and close the switch 57 to operate motor 45 in a clockwise direction to operate the valve disc 15 of the distributor valve 11 for unloading the compressor throughout any one of the fractional capacity unloading steps above referred to. When the receiver pressure drops below this predetermined degree, the diaphragm 47 will move down and the lever 52 will also move down, which will make a contact through the switch 56 and operate the motor 45 in a contra-clockwise direction for rotating the disc 15 of the distributing valve 11 to relieve the respective control valve or valves of pressure and permit their closing to load the compressor. After the motor 45 has operated sufficiently to move the disc 15 through one distinct step, contact through either the switch 57 or 56, which is permitting energizing of the motor, is broken by means of the cam 60 and crank lever 61. The cam 60 has a number of steps thereon to permit the desired number of distinctive positions of the valve 15, so that, when the valve reaches one of these positions, the mercoid switch 55 will be moved by the lever 61 to break the contact, stop the motor and stop the valve disc in its proper position. Contact through either of the switches for energizing the motor 45 will continue broken until the diaphragm 47 moves again under sufficient pressure variance to again move the mercoid switch structure 55 to close contact through either of the switches 56 or 57 and the motor 45.

The lever 52 has a weight 63 and a loading spring 64 connected thereto and the weight 63 and the tension of the spring 64 load the lever 52 so that the force applied to the lever 52 by these members resists movement of the diaphragm 47 and determines the discharge or receiver pressure at which the regulator will operate. The amount of the weight 63, and tension of the spring 64 are the only adjustments required in order to vary the discharge or receiver pressure. By varying the amount of the weights and spring tension, so that the total force on the lever 52 remains the same, the drop in pressure between points of loading and unloading can be varied within reasonable limits.

Summing up, generically the function and operation of the regulator is as follows: air pressure from the receiver 46 is exerted on the diaphragm 47, the movement of which is resisted by the lever 52, carrying the weight 63 and spring 64. The force applied to the lever 52 by the weight 63 and spring 64 determines the discharge pressure of the compressor A at which the regulator or governor will operate.

The movement of the lever 52, through the adjustable connection 54, operates the mercoid switch 55 which makes electrical contact and starts the motor 45 in clockwise or contra-clockwise direction, depending upon direction of movement of the lever 52, and consequently upon rise or fall of the discharge pressure exerted on the diaphragm 47.

The operation of the motor 45, through the worm 44 and worm gear 43 is transmitted to the pinion 39 which is mounted on the same shaft with the worm gear 43. The movement of the pinion 39, by means of the pin 38 and recesses 41, is transmitted to the Geneva intermittent gear 37, and from the gear 37 through the shaft 36, bevelled gears 35 and shaft 31, to the distributing valve 11, which, depending upon the direction of rotation either admits to or relieves the pressure inside of the control valves 1, 2 and 3 for loading or unloading the compressor A. The step cam 60 on the shaft 36 is adjusted to the proper position so that whenever a full opening of any of the ports of the distributing valve 11 is obtained, a different step on the cam comes into contact with the roller 61' on the angle arm 61. This causes the angle arm to move on its fulcrum and move the mercoid switch 55 sufficiently to break the electrical contact and stop operation of the motor 45, until further change in pressure, exerted on the diaphragm 47, will again start the motor.

The ports in the distributing air valve 11, the slots or recesses 41 in the Geneva gear 37 and the steps on the cam 60, are made with equal angularity to ensure positive action of the regulator and prevent any hunting or indecisive action.

The changes in the location of the ports of the distributing valve 11, for the purpose of controlling loading or unloading of the compressor A, are the changes from the position shown in diagrammatic Fig. 6 of the drawings to the position shown in Fig. 7 of the drawings, from the position shown in Fig. 7 of the drawings, either back to the position shown in Fig. 6 or forwardly to the position shown in Fig. 8 of the drawings. From the position shown in Fig. 8 of the drawings, the movement is either back to the position shown in Fig. 7 or forward to the position shown in Fig. 9, while from the position shown in Fig. 9 the valve may be operated either forwardly to the position shown in Fig. 10 or back to the position shown in Fig. 8, all of such variations in the position of the valve depending on the rise or fall of the pressure exerted on the diaphragm 47, and these movements to the various positions control the unloading or loading the compressor A, in the manner hereinbefore described.

Adjustable set screws 70 and 71 are carried by the diaphragm housing 49 and are employed to prevent electrical contact in case a higher pressure is exerted on the diaphragm 47 than that for which it is set, (such condition being possible when a number of compressors are working on the same system) and also to limit the maximum capacity of the compressor to any desired capacity. In other words, by adjusting the screws 70 and 71, the maximum capacity of the compressor can be maintained at either 75, 50 or even 25 per cent of the load of the compressor, and never permit the compressor to go above the desired capacity for which it is set by the adjustment of the set screws.

An indicator as shown at 72 in Fig. 1 of the drawings is connected to the shaft 36 and indicates or shows at all times the state of loaded or unloaded condition in which the compressor is operating.

Whenever any suitable kind of protection is used in connection with the compressor, for instance, power demand limitator, water failure, bearings temperature, overload relay, etc., or when dual control is used, (such as by-pass control and stop and start control of the compressor) the solenoid operated valve structure 30 is employed.

This solenoid operated valve structure 30 includes the valve casing 75 which is connected through the port 76 and pipe 77 with the exhaust port 26 of the distributor valve 11. The port 76 opens into a suitable chamber 78 into which ports 79 and 80 open. The port 79 is connected with a suitable supply source (not shown) of pressure fluid, while the port 80 bleeds to the atmosphere. A solenoid 81 is provided which operates the piston 82 of the valve structure 30 and this solenoid is connected in series in the usual manner with any or all protective devices of any approved type used in connection with the compressor and it remains energized during normal operation of the compressor, during which period the port 76 is in communication with port 79 on Fig. 11, permitting fluid under pressure to exhaust from the distributor valve 11 to the atmosphere. However, should any one of the protective devices function and break the electrical current going through the solenoid 81, the piston 82 is moved by the solenoid core to close the port 79 and establish communication between the ports 76 and 80, permitting fluid under pressure to pass through the exhaust port 26 in the distributor valve 11, and from this exhaust port through to any of the control valves 1, 2 or 3, which may, at that time, be in a loaded state, their control ports and the valve 15 being in communication with the exhaust port 26 of the valve.

When the fluid under pressure is admitted through the exhaust port 26 of the distributor valve 15, it will operate the control valves 1, 2 and 3, and completely unload the compressor A, regardless of its regulator controlled loaded or unloaded condition.

It is to be understood that the invention is not to be limited to the specific construction or arrangement of parts shown but that these may be modified widely within the invention defined by the claims.

What is claimed is:

1. The combination with a variable capacity air or gas compressor, of pressure operated control valves for controlling the unloading and loading of the compressor, a distributor valve including a rotary disc controlling admission of pressure fluid to said control valves, electrically operated means for rotating said disc, and pressure responsive means controlling operation of said electrically operated means.

2. The combination with a variable capacity air or gas compressor, of pressure operated control valves for controlling unloading and loading of the compressor, a distributor valve including a rotary disc controlling admission of pressure fluid to said control valves, and electrically operated means for rotating said disc.

3. The combination with a variable capacity air or gas compressor, of pressure operated control valves for controlling unloading and loading of the compressor, a distributor valve including a rotary disc controlling admission of pressure fluid to said control valves, intermittently operated means for rotating said disc in step by step movement to provide fractional unloading or loading of the compressor, and means for positively stopping movement of said distributor valve upon completion of each step movement.

4. The combination with a variable capacity air or gas compressor, of pressure operated control valves for controlling the unloading and loading of the compressor, a distributor valve including a rotary disc controlling admission of pressure fluid to said control valves, intermittently operated means for rotating said disc in step by step movement to provide stepped fractional unloading or loading of said compressor, an electric motor for operating said intermittently operated means, and pressure responsive means controlling operation of said motor.

5. The combination with a variable capacity air or gas compressor, of pressure operated control valves for controlling the unloading and loading of the compressor, a distributor valve including a rotary disc controlling admission of pressure fluid to said control valves, intermittently operated means for rotating said disc in step by step movement to provide stepped fractional unloading or loading of said compressor, an electric motor for operating said intermittently operated means, pressure responsive means controlling operation of said motor, and tensioning means for regulating the degree of pressure at which said pressure responsive means acts to operate said switch.

6. The combination with a variable capacity air or gas compressor, of pressure operated control valves for controlling unloading and loading of the compressor, a distributor valve including a rotary disc controlling admission of pressure fluid to said unloading valves, intermittently operated means for rotating said disc in step by step movement to provide stepped fractional unloading or loading of said compressor, an electric motor for operating said intermittent means, a switch controlling energizing of said motor, and pressure responsive means for operating said switch.

7. The combination with a variable capacity air or gas compressor, of control valves for controlling loading and unloading of the compressor, a distributor valve including a rotary disc and controlling admission of pressure fluid to said control valves, an electric motor for rotating said disc, pressure responsive means controlling energizing of said motor, said motor rotatable clockwise or contra-clockwise depending upon the rise or fall of pressure on said pressure responsive means, said distributor valve disc rotatable in unison with the motor for controlling unloading or loading of the compressor.

8. The combination with a variable capacity air or gas compressor, of pressure operated control valves for controlling unloading and loading of the compressor, a distributor valve controlling admission of pressure fluid to said control valves, electrically operated means for intermittently operating said distributor valve to unload or load the compressor, and means associated with said distributor valve for admitting pressure to all of said control valves for completely unloading the compressor at predetermined times.

9. The combination with a variable capacity air or gas compressor, of pressure operated control valves for controlling unloading and loading of the compressor, a distributor valve including a rotary disc and controlling admission of pressure fluid to said control valves, intermittently operated means for rotating said distributor valve disc in step by step movement to provide stepped fractional unloading or loading of said compressor, and means associated with said distributor valve for admitting pressure fluid to all of said control valves for completely unloading the compressor at predetermined times.

10. The combination with a variable capacity air or gas compressor, of pressure operated control valves for controlling unloading and loading of the compressor, a distributor valve controlling admission of pressure fluid to said control valves, electrically operated means for intermittently operating said distributor valve to unload or load the compressor, a solenoid operated valve associated with said distributor valve and operated at predetermined times for admitting pressure fluid to all of said control valves for completely unloading said compressor.

11. The combination with a variable capacity air or gas compressor, of pressure operated control valves for controlling the unloading and loading of the compressor, a distributor valve including a rotary disc and controlling admission of pressure fluid to said control valves, an electric motor, means connecting the motor with said valve disc for effecting operation of the distributor valve, a supply circuit for said motor, a switch in said supply circuit for controlling the operation of the motor and its direction of rotation, a pressure responsive device for operating said switch to operate said motor, a cam member operated by the motor for rendering said switch inoperative for operating the motor at a plurality of points between the limits of operation of said valve and to await further variation in pressure acting on the pressure sensitive device for a further operation of the motor.

12. The combination with a variable capacity air or gas compressor, of pressure operated control valves for controlling loading and unloading of the compressor, a distributor valve, said distributor valve comprising a stationary body provided with a plurality of ports communicating one with each of said control valves, with an exhaust port and with an inlet for pressure fluid, a rotary disc embodied in said valve provided with a plurality of passageways and rotatable to establish communication between the pressure fluid inlet and the ports in said stationary body to control admission of pressure fluid to said control valves, and electrically operated means for rotating said disc.

13. The combination with a variable capacity air or gas compressor, of pressure operated control valves for controlling loading and unloading of the compressor, a distributor valve, said distributor valve comprising a stationary body provided with a plurality of ports communicating one with each of said control valves, with an exhaust port and with an inlet for pressure fluid, a moveable member embodied in said valve provided with a plurality of passage ways and moveable to establish communication between the pressure fluid inlet and the ports in said stationary body to control admission of pressure fluid to said control valves, intermittently operated means for moving said moveable member in step by step movement to provide stepped fractional unloading or loading of said compressor, electrically operated means for operating said intermittently operated means, and means for positively stopping movement of said moveable member upon completion of each step movement thereof.

14. The combination with a variable capacity air or gas compressor, of pressure operated control valves for controlling loading and unloading of the compressor, a distributor valve, said distributor valve comprising a stationary body provided with a plurality of ports communicating one with each of said control valves, with an exhaust port and with an inlet for pressure fluid, a moveable member embodied in said valve provided with a plurality of passageways and moveable to establish communication between the pressure fluid inlet and the ports in said stationary body to control admission of pressure fluid to said control valves, intermittently operated means for moving said moveable member in step by step movement to provide stepped fractional unloading or loading of said compressor, electrically operated means for operating said intermittently operated means, means for positively stopping movement of said moveable member upon completion of each step movement thereof, and means operable independently of said intermittently operated means for admitting pressure fluid through said distributor valve to all of said control valves for completely unloading the compressor at predetermined times.

15. The combination with a variable capacity air or gas compressor, of pressure operated control valves for controlling unloading and loading of the compressor, a distributor valve controlling admission of pressure fluid to said control valves, said distributor valve including a stationary body provided with a plurality of ports communicating one with each of said control valves, with an exhaust port and with an inlet for pressure fluid, said distributor valve also including a rotary disc provided with a plurality of passageways and rotatable to establish communication between the pressure fluid inlet and the ports in said stationary body to control admission of pressure fluid to said control valves, and intermittently operated means for rotating said distributor valve disc in step by step movement to provide stepped fractional capacity unloading or loading of said compressor.

16. The combination with a variable capacity air or gas compressor, of pressure operated control valves for controlling unloading and loading of the compressor, a distributor valve controlling admission of pressure fluid to said control valves, said distributor valve including a stationary body provided with a plurality of ports communicating one with each of said control valves, with an exhaust port and with an inlet for pressure fluid, said distributor valve also including a rotary disc provided with a plurality of passageways and rotatable to establish communication between the pressure fluid inlet and the ports in said stationary body to control admission of pressure fluid to said control valves, an electric motor, means connecting the motor and valve disc for rotating the disc, a supply circuit for said motor, a switch in said supply circuit for controlling the operation of the motor and its direction of rotation, a pressure responsive device for operating said switch to operate the motor, and a cam member operated by the motor for rendering said switch inoperative for operating the motor at a plurality of points between the limits of rotation of said distributor valve disc and to await further variation in pressure acting on the pressure responsive device for a further operation of the motor.

17. The combination with a variable capacity air or gas compressor, of pressure operated control valves for controlling the unloading and loading of the compressor, a distributor valve controlling admission of pressure fluid to said control valves, intermittently operated means for moving said distributor valve in step by step movement to provide stepped fractional unloading or loading of said compressor, an electric motor for operating said intermittently operated means, and means for positively stopping movement of said distributor valve upon completion of each step movement.

18. The combination with a variable capacity air or gas compressor, of pressure operated control valves for controlling unloading and loading of the compressor, a distributor valve including a rotary disc controlling admission of pressure fluid to said control valves, and intermittently operated means for rotating said disc in step by step movement to provide fractional unloading or loading of the compressor.

19. The combination with a variable capacity air or gas compressor, of pressure operated control valves for controlling the unloading and loading of the compressor, a distributor valve including a rotary disc controlling admission of pressure fluid to said control valves, intermittently operated means for rotating said disc in step by step movement to provide stepped fractional unloading or loading of said compressor, an electric motor for operating said intermittently operated means, pressure responsive means controlling operation of said motor, a switch controlling energizing of said motor, and means responsive to pressure of fluid pumped for operating said switch.

20. The combination with a variable capacity air or gas compressor, of pressure operated control valves for controlling loading and unloading of the compressor, a distributor valve including a rotary disc controlling admission of pressure fluid to said control valves, electrically operated means for rotating said disc, means responsive to pressure of fluid pumped for controlling energizing of said electrically operated means, and tensioning means for regulating the degree of pressure at which said pressure responsive means acts.

21. The combination with a variable capacity air or gas compressor, of control valves for controlling loading and unloading of the compressor, a distributor valve including a rotary disc and controlling admission of pressure fluid to said control valves, an electric motor for rotating said disc, pressure responsive means controlling energizing of said motor, said motor rotatable clockwise or contra-clockwise depending upon the rise or fall of pressure on said pressure responsive means, said distributor valve disc rotatable in unison with the motor for controlling unloading or loading of the compressor, and means for positively stopping movement of said distributor valve disc upon completion of each step movement.

22. The combination with a variable capacity air or gas compressor, or pressure operated control valves for controlling unloading and loading of the compressor, a distributor valve including a rotary disc and controlling admission of pressure fluid to said control valves, intermittently operated means for rotating said distributor valve disc in step by step movement to provide stepped fractional unloading or loading of said compressor, and means associated with said distributor valve for admitting pressure fluid to all of said control valves for completely unloading the compressor at predetermined times, said last named means operable independently of said intermittently operated means.

23. The combination with a variable capacity air or gas compressor, of pressure operated control valves for controlling the unloading and loading of the compressor, a distributor valve including a rotary disc and controlling admission of pressure fluid to said control valves, an electric motor, means connecting the motor with said valve disc for effecting operation of the distributor valve, a supply circuit for said motor, a switch in said supply circuit for controlling the operation of the motor and its direction of rotation, a pressure responsive device for operating said switch to operate said motor, a cam member operated by the motor for rendering said switch inoperative for operating the motor at a plurality of points between the limits of operation of said valve and to await further variation in pressure acting on the pressure sensitive device for a further operation of the motor, and tensioning means for regulating the degree of pressure at which said pressure responsive device acts for operating said switch to operate said motor.

24. The combination with a variable capacity air or gas compressor, of pressure operated control valves for controlling loading and unloading of the compressor, a distributor valve, said distributor valve comprising a stationary body provided with a plurality of ports communicating one with each of said control valves, with an exhaust port and with an inlet for pressure fluid, a moveable member embodied in said valve provided with a plurality of passageways and moveable to establish communication between the pressure fluid inlet and the ports in said stationary body to control admission of pressure fluid to said control valves, intermittently operated means for moving said moveable member in step by step movement to provide stepped fractional unloading or loading of said compressor, electrically operated means for operating said intermittently operated means, means for positively stopping movement of said moveable member upon completion of each step movement thereof, pressure responsive means controlling energizing of said electrically operated means, and tensioning means for regulating the degree of pressure at which said pressure responsive means acts.

25. The combination with a variable capacity air or gas compressor, of pressure operated control valves for controlling unloading and loading of the compressor, a distributor valve controlling admission of pressure fluid to said control valves, said distributor valve including a stationary body provided with a plurality of ports communicating one with each of said control valves, with an exhaust port and with an inlet for pressure fluid, said distributor valve also including a rotary disc provided with a plurality of passage ways and rotatable to establish communication between the pressure fluid inlet and the ports in said stationary body to control admission of pressure fluid to said control valves, intermittently operated means for rotating said distributor valve disc in step by step movement to provide stepped fractional capacity unloading or loading of said compressor, an electric motor for operating said intermittently operated means, a switch controlling energizing of said motor, and pressure responsive means for operating said switch.

26. The combination with an air or gas compressor, of unloading mechanisms, a distributor valve for controlling distribution of pressure fluid to said unloading mechanisms, electrically operated means for operating said valve, pressure responsive means controlling operation of said electrically operated means, and means associated with said distributor valve for admitting pressure fluid in a reverse direction to its normal flow through said distributor valve to said unloading mechanisms for completely unloading the compressor.

27. The combination with a variable capacity air or gas compressor, of pressure operated controlled valves for controlling unloading and loading of the compressor, a distributor valve controlling admission of pressure fluid to said control valves, said distributor valve including a stationary body provided with a plurality of ports communicating one with each of said control valves, with an exhaust port and with an inlet for pressure fluid, said distributor valve also including a rotary disc provided with a plurality of passage ways and rotatable to establish communication between the pressure fluid inlet and the ports in said stationary body to control admission of pressure fluid to said control valves, intermittently operated means for rotating said valve disc in step by step movement to provide stepped fractional capacity unloading or loading of said compressor, and means associated with said distributor valves for admitting pressure fluid to said control valves through said exhaust port for operating all of said control valves to completely unload the compressor.

28. The combination with a variable capacity air or gas compressor, of pressure operated control valves for controlling unloading and loading of the compressor, a distributor valve controlling admission of pressure fluid to said control valves, electrically operated means for intermittently operating said distributor valve to unload or load the compressor, a normally energized solenoid valve associated with said distributor valve and operated upon de-energizing of the solenoid for admitting pressure fluid in a reverse direction to its normal directional flow through said distributor valve to said control valves for completely unloading the compressor.

29. The combination with a variable capacity air or gas compressor, of pressure fluid operated unloading mechanism, a distributor valve having an exhaust port, a rotary disc in said distributor valve controlling said exhaust port and the admission of pressure fluid to said unloading mechanisms, and means associated with said exhaust port for admitting pressure fluid to all of said unloading mechanisms through the exhaust port for completely unloading the compressor.

30. The combination with a variable capacity air or gas compressor of pressure fluid operated unloading mechanisms, a distributor valve having an exhaust port, a rotary disc in said distributor valve controlling said exhaust port and the admission of pressure fluid to said unloading mechanisms, a valve controlling the exhaust port of said distributor valve, a normally energized solenoid operating said valve, said valve operable upon de-energizing of said solenoid to said unloading mechanisms through the exhaust of said distributor valve.

In testimony whereof I affix my signature.
ALEXANDER V. SAHAROFF.